S. W. CRAMER & W. B. HODGE.
REGULATOR FOR AIR CONDITIONING APPARATUS.
APPLICATION FILED FEB. 11, 1911. RENEWED APR. 3, 1914.
1,231,570.
Patented July 3, 1917.
3 SHEETS—SHEET 1.
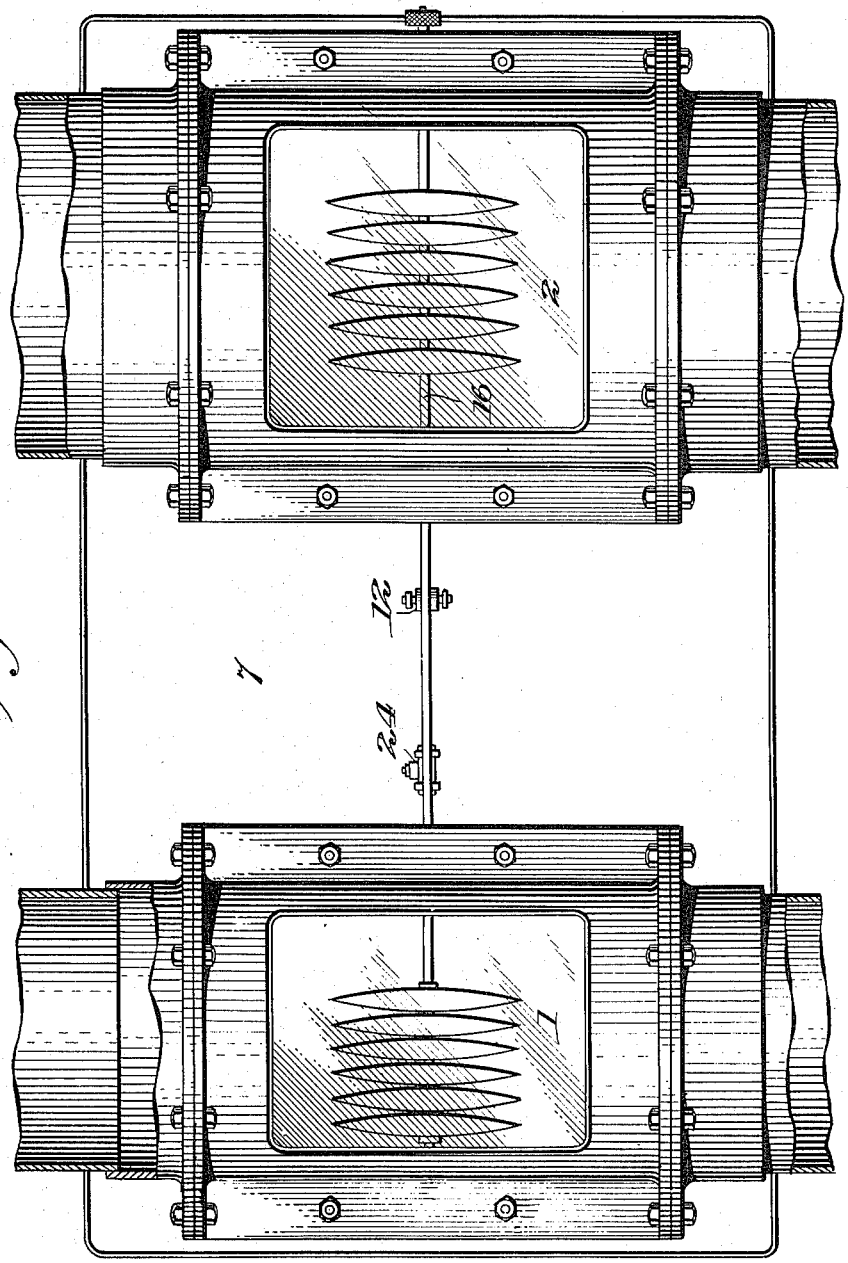

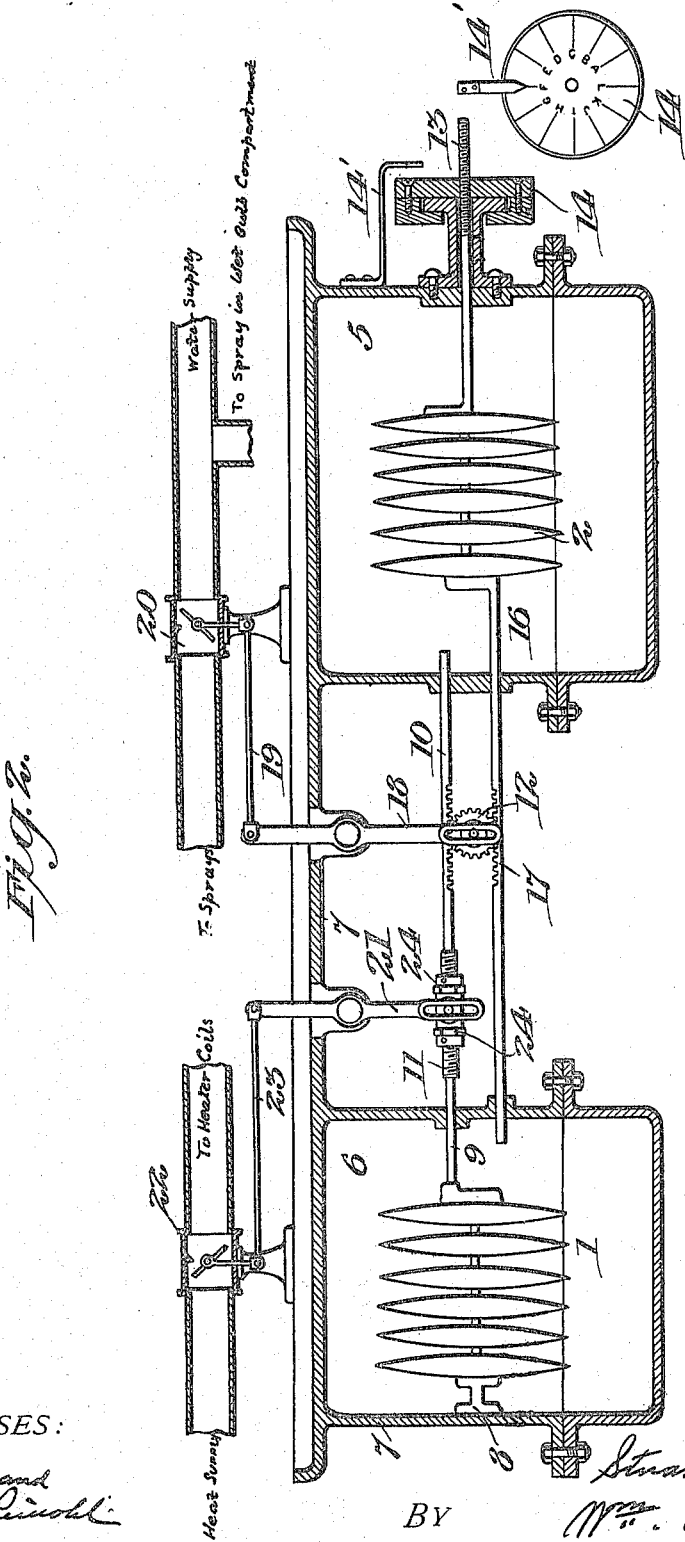

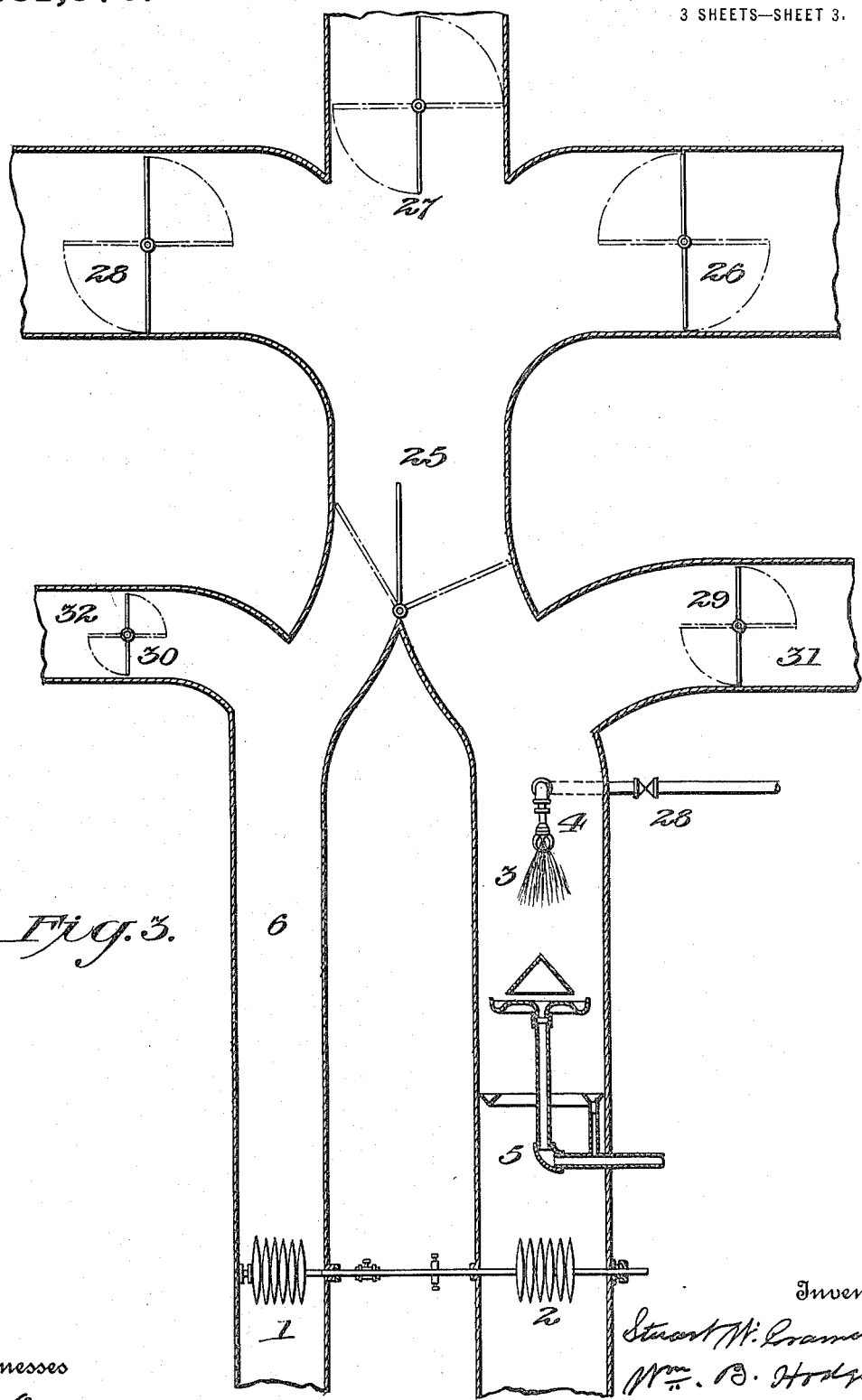

UNITED STATES PATENT OFFICE.

STUART W. CRAMER AND WILLIAM B. HODGE, OF CHARLOTTE, NORTH CAROLINA.

REGULATOR FOR AIR-CONDITIONING APPARATUS.

1,231,570.     Specification of Letters Patent.     Patented July 3, 1917.

Application filed February 11, 1911, Serial No. 608,065. Renewed April 3, 1914. Serial No. 829,380.

*To all whom it may concern:*

Be it known that we, STUART W. CRAMER and WILLIAM B. HODGE, citizens of the United States, residing at Charlotte, in the county of Mecklenburg and State of North Carolina, have invented certain new and useful Improvements in Regulators for Air-Conditioning Apparatus; and we do hereby declare the following to be a full, clear, and exact description of the invention, such as will enable others skilled in the art to which it appertains to make and use the same.

This invention relates to apparatus for automatically regulating the moisture and heat supplied to the air of a given apartment or building, and its object is to provide an instrument and system for this purpose of extreme simplicity and durability, and of high sensibility in respect of its response to humidity changes, and more especially to provide means whereby the rate of the moisture supply is automatically varied in proportion to the extent of such changes, as will be hereinafter more fully described. To this end, the invention consists in the combination, relation and mode of operation of the several parts and subcombinations thereof, as more particularly pointed out in the appended claims.

In the drawings forming a part hereof Figure 1 is an elevation of a temperature and humidity regulating instrument with its pipe connections broken away, embodying and exemplifying the present invention.

Fig. 2 is a transverse horizontal section of Fig. 1 taken on a plane just above the axis of the thermo-expansive members, showing the latter in plan, and certain heating and moisture apparatus in diagram of obvious arrangement.

Fig. 3 is a further diagrammatical representation of the system of pipes or conduits in which the instrument of Figs. 1 and 2 may be usefully employed.

Referring to the drawings, the numeral 1 indicates a thermo-expansive member, which, in the present case, is used to indicate the dry bulb temperature of the air in contact with it, being therefore termed the dry bulb member of the instrument. This member may consist of one or several flexible-walled containers in the form of expansible hollow disks, partly or wholly filled with some thermo-responsive liquid or medium which gives strong and rapid expansile and contractile movement to the walls of said containers under varying temperatures. Where several of these containers are used, they are so arranged, as in the present case, that each acts cumulatively with the others; that is to say, when two or more are joined together the expansion of the series is the aggregate of the individual expansions of each container, and as many of them can be joined in this way as may be necessary to provide the force and motion required for properly moving the parts connected to it as later explained. In this way the bank or series of these containers may be manufactured with substantially uniform expansive characteristics, thereby greatly facilitating the assemblage and initial adjustment of the apparatus. The entire bank or series may be, and is preferably mounted in a chamber 6 which forms part of a conduit through which the air of the room to be controlled is caused to pass or circulate. One end of the dry bulb member is fastened to a stud 8 on one side wall of the chamber, and the other end—the movable end—is provided with a rack rod 9, which passes through and is guided in the opposite wall, thus supporting the dry bulb member crosswise in the conduit or chamber.

The wet bulb member of the instrument is designated 2 and comprises a similar bank of similar flexible-walled containers and is intended to be exposed to different temperature conditions, as for instance the temperature of evaporation of water. For this purpose such member may be placed in a chamber 5, similar to the chamber 6 and forming part of another conduit, wherein it will be subjected to a current of saturated or supersaturated air passing or circulating therethrough. The saturated air current may be produced in the manner indicated by Fig. 3, wherein a stream of water flows under pressure, from a nozzle 4 in the form of a highly attenuated spray marked 3, saturating the air surrounding it, and at the same time inducing a current of air through the chamber in the direction of the spray. The member 2 is located at the proper distance from the spray so as to be thereby maintained at the temperature of the saturated or supersaturated air which is the wet-bulb temperature of such air according to the principles disclosed in United States Patent No. 871,163, dated November 19, 1907, and which the present invention preferably employs. This wet bulb member, in an uncovered or naked condition is placed crosswise in its chamber 5 with one end provided with a tail rod 13 held by a nut 14, and its other, active, end provided with a rack rod 16 extending through and guided in the opposite wall as in the case of the dry bulb rack-rod 9 above described. The nut 14 is for the purpose of adjusting the position of the member with reference to the other member and the other operating devices and connections, and is for this purpose mounted upon a stud on the casing wall in such manner as to be free to rotate thereon in one plane only, by which rotation it will produce endwise movement of the tail rod in an obvious manner. A suitable scale is inscribed on the face of the nut to be used in connection with the fixed pointer 14'.

As shown more clearly in Fig. 1, the two compartments 5 and 6 are mounted on or form part of a common base or casting 7, and are provided with removable and fenestrated covers, as indicated, while their upper and lower ends are suitably formed for connection with the conduits of which they respectively form parts. It will be noticed that the two members are thus independently mounted so that each is easily accessible for adjustment or repair and so that each will be suitably isolated from the temperature conditions affecting the other. It will hereinafter appear that such members are also arranged so as to act, each independently of the other, that is to say, so that their expansive and contractile efforts are individually and independently imparted to the instrumentalities whereby the moisture device is controlled or actuated, this being in contra-distinction to arrangements heretofore proposed, wherein the expansive effort of one of two thermo-expansive members is transmitted through the other member to the ultimate point of control.

According to this invention, both thermo-expansive members, by their rods 9 and 16, are connected to impart their individual movements directly or through suitable motion-imparting connections to a part which may be appropriately called a differential connector. This part or connector is connected to both members and receives the individual movements of both, resolving such movements into a bodily motion of its own, which, as the resultant of the two independent movements, may equal the difference between them. In the present case, the connector referred to is a differential pinion 12 in mesh on one side with the rack teeth 17 of rack-rod 16, and on the other side with the toothed portion 10 of the rack-rod 9. The pinion is provided with an axle which is supported in oblong slots in the forked arms of a lever 18, which embrace the racks as well as the pinion to maintain the latter in proper engagement with the former.

It will be evident from the foregoing that simultaneous equal expansion or contraction of the two thermo-expansive members will impart equal rotary effects to the pinion on its opposite sides, rotating it on its axis without however shifting such axis in one direction or the other, but that a difference in the thermic changes of the two members, producing different extents of movement of the two rack rods, will cause the pinion to roll more on one rack than on the other and thus cause its axis and axle to shift in one direction or the other according to the difference of the expansions, or contractions, the said pinion receiving a rectilinear bodily motion as the resultant of the two tendencies causing its rotation. Such motion corresponds to the difference of temperature affecting the two members as will be obvious and is imparted to the lever 18. This lever extends through the base plate 7, upon which it is fulcrumed, and is connected by a link 19 with the moisture gate 20 which serves to restrict or enlarge the passage way for moisture in the pipe which leads from the water supply to the apartment to be controlled, so as to discharge more or less, or no, moisture into such compartment. The said valve or moisture gate 20 is thus a device which is in immediate control of the moisture conditions of the apartment, and through the connections represented by the lever 18 and the differential pinion 12, it is actuated by the power of the expanding (or contracting) medium. Its movement and its resulting positions are thus in direct and uniform accordance with the differential expansion or action of the thermic members being open or closed when the difference of temperature of the said members reaches the maximum or minimum limit respectively, and being more or less closed for all intermediate conditions of difference between such temperatures. An intermediate range or variable control is thus provided which will cause a very slight change in humidity conditions to effect a corresponding slight corrective change in the moisture supply, and will thereby maintain humidity conditions which are practically uniform. In prior devices, utilizing an intervening source of power to act as a relay between the thermo-expansive members and the water valve or moisture gate, such uniformity of control has not been attained because the thermo-expansive members have served merely to turn on and off such intervening source of power, which in turn has opened full or closed the valve or mechanism in immediate control of the moisture supply, with no facilities for changing the supply in response to slight changes in the humidity conditions of the apartment. As an independent feature, the present invention also involves the above described manner of inter-connection of two independently-acting thermo-expansive members by means of motion-imparting differential gearing, represented in the present case by the racks and pinion, and which produce a resultant or differential motion varying in accordance with humidity changes, and having sufficient force to adapt it to be connected to the mechanism which controls, either mediately or immediately, the moisture supply.

Inasmuch as the dry bulb member expands and contracts in accordance with the changes of the dry bulb temperature, advantage can be taken of such action for automatically controlling the temperature of the room or apartment to be controlled, co-incidentally with the control of its humidity in the manner above described. For this purpose the rack rod 9 is provided with screw thread 11, forming an adjustable connection between itself and the lever 21 pivoted to and extending to the rear of the base plate 7, where it is connected by a link 23 with a steam or heat-controlling valve 22. This valve is also variably controlled by the action of the dry bulb member through a range intermediate between its maximum and minimum positions. When the dry bulb member is cool, the flexible containers thereof will be contracted and the lever 21 will move so as to open the heat supply valve 22, and when the containers expand and move the lever in the opposite direction this valve will be more or less closed and the supply of heat to the heater coils thereby cut off, more or less depending upon the degree of expansion, i. e., degree of temperature change in the dry bulb member. Check nuts 24 on the rod 9 permit adjustment between the heat valve and the dry bulb member in obvious manner, and whereby the heat regulation can be accurately coördinated with the control of the humidity.

Referring now to Fig. 3, 25 represents a conduit, through which air is forced from any suitable supply, and wherein it may be divided by a deflecting damper, so that part will pass over the dry bulb member 1 through the leg marked 6 (corresponding to the chamber 6 above referred to), and part will pass through the other leg marked 5 (corresponding to the chamber 5 above referred to), wherein it will encounter and become saturated by the spray 3 and impinge upon the wet bulb member 2. The air may be taken from any suitable source, such as a room the temperature and humidity of which it is desired to control, or from the outside atmosphere, so that the temperature and humidity of the air passing into the building can be regulated to correspond with outside conditions. The source of air supply is immaterial; in fact, and as shown in the drawing, several conduits can be provided, and then by means of dampers 26, 27, 28 it can be taken from any source whatever and directed in whole or in part through either leg 6 or 5; or, as is sometimes convenient, the wet bulb member 2 can be maintained at the temperature of saturation by means of air directed into leg 5 from duct 31 (damper 29 being opened) while the dry bulb member is maintained at the temperature of air from a different source admitted through the leg 6 from the supply conduit 32 under the control of a damper or valve 30,—in this case the deflected damper 25 is of course to be closed on one side or the other so as to keep the two airs separate.

The action of the regulating instrument is as follows:—Air being supplied through the conduit 25 to both wet and dry bulb members, the dry bulb member assumes the temperature of the air passing over it, and the wet bulb member assumes the temperature of the saturated air passing over it. These members therefore expand or contract as the case may be, and the levers controlling the water and heat supply valves thereupon assume positions which correspond with these temperatures according to the original setting of the instrument. If the temperature of the air passing over the dry bulb member is lower than the point at which the heating valve is set, more or less steam will be admitted to the heating coil, thereby changing the temperature of the air and raising it. If the humidity of the air passing over the wet and dry bulb members is too low, thereby representing a difference in temperature greater than that desired, then in order to restore the equilibrium, the water valve 20 will be turned on and the spray nozzles put in operation to saturate the air in the humidifiers. As, however, the relative humidity increases, the differences in temperature between the wet and the dry bulb members becomes less and less, and assuming that the dry bulb temperature remains the same, and the wet bulb temperature increases, it is evident that rod 16 attached to the wet bulb member 2 will move the pinion 12 in such a direction as ultimately to close the water valve 20. The initial wet-bulb depression is set by means of the indicating nut 14 at the end of the wet bulb member; it being rotated to the desired point as indicated on the scale. It is evident that changes can be effected in the shape and arrangement of this rack and pinion to produce an increased or decreased movement, also that the lever 18 may be adjustably attached to pinion 12, in order to vary as the resultant of this differential movement of the racks.

I claim:

1. In an apparatus for automatically regulating the humidity in an apartment, the combination of wet and dry bulb expanding members comprising flexible receptacles confining fluid, a device in immediate control of the moisture conditions in the said apartment, and differentially-acting gearing connecting the said members to said device, whereby the latter is moved by the contractile or expansive force of the said members.

2. In apparatus for automatically regulating humidity in an apartment, the combination of two independently-acting thermo-expansive members respectively subjected to wet and dry bulb temperatures, a supply of moisture for said apartment, a device in immediate control of such supply, and differentially-acting gearing connecting the said device to said members whereby the expansive movement of the latter is imparted to and actuates the said device for variably altering the rate of moisture supply.

3. In air-conditioning apparatus of the kind described two independently-acting thermo-expansive members comprising flexible receptacles confining fluid subjected to different temperature changes, a controlling device having operating connections to said members including a differential connector subject to movement by the expansive or contractile forces of both members, and thereby receiving a motion representing the resultant of said movements, and means for imparting such resultant motion to the aforesaid controlling device for variably moving the same.

4. In air-conditioning apparatus of the kind described, two independently-supported, and independently-acting thermo-expansive members respectively influenced by wet and dry bulb temperatures, a controlling device and operating connections therefor including a differential connector receiving simultaneous and different movements from both said independent members and imparting the resultant of such movements to said controlling device.

5. In air-conditioning apparatus of the kind described, a moisture supply and a movable controlling device therefor, adapted for variably increasing and decreasing such supply between the limits thereof, in combination with wet and dry bulb thermo-expansive members differentially connected to and moving said controlling device in proportion to deviations from a predetermined difference of the temperature to which said members are adjusted.

6. In air-conditioning apparatus of the kind described, a suitable moisture supply, a controlling device adapted for movement through a range of positions for variably increasing or decreasing such supply between the limits thereof, in combination with wet and dry bulb thermo-expansive members comprising flexible receptacles containing liquid, and a differential connector subject to the contractile and expansive movement of both said members and imparting the resultant of both such movements to said controlling device, whereby the latter is variably regulated according to the degree of change of the differences between the wet and dry bulb temperature.

7. Air-conditioning apparatus comprising two thermo-expansive members subjected to different temperature changes, a rack-rod member connected to be moved by each of said members, a rotary member common to both said rack-rod members and engaged thereby to be moved according to the differential expansion of said expansive members and a controlling device connected to said rotary member and operated by its said differential movement.

8. Air-conditioning apparatus comprising a dry bulb thermo-expansive member and an independent naked wet-bulb member and means for directing a current of saturated air upon the latter member, in combination with a system of differential gearing independently connected to each of said members and receiving the expansive or contractile movements of both said members under changing temperatures and a controlling device connected to said gearing and moved by the resultant of such motions thereon.

9. Air-conditioning apparatus comprising a suitable compartment or conduit and means for producing a current of saturated air therein, a liquid-containing wet bulb member in such compartment and a liquid containing dry bulb member outside thereof, in combination with differential gearing connecting said members and receiving the expansive or contractile movements of both, and a movable controlling device connected to such gearing and receiving therethrough the differential resultant of such movements.

10. Air-conditioning apparatus comprising wet and dry bulb thermo-expansive members, differential gearing connecting the same, a movable device in immediate control of the moisture supply and a second movable device in immediate control of the heat supply—the first device being connected to and actuated by the said gearing and the second by the dry bulb member, and both serving to produce variable control of their respective supplies.

11. Air-conditioning apparatus comprising two liquid-containing thermo-expansive members, a differential connector adapted to receive the expansive or contractile movements of both members, a moisture controlling device having connections for receiving variable motion from such connector according to variations in the differences of such movements, and means for setting such connections to vary the wet bulb depression.

12. Air-conditioning apparatus comprising two compartments or conduits, means for producing currents of normal and saturated air respectively through each, a wet bulb thermo-expansive member in one compartment exposed to the saturated current, a dry bulb thermo-expansive element in the other, and a moisture supply, in combination with a moisture device in immediate control of the moisture supply and means for imparting the differential movement of such members to such device.

13. The combination of two rack rod members each subject to movement according to changes in wet and dry bulb temperatures, a differential pinion engaged by both rack rod members adapted to resolve the motions received from each, and a part moved by such pinion to positions corresponding to different humidity conditions.

14. The combination of wet and dry bulb thermo-expansive members, each comprised of one or more receptacles containing thermo-expansive fluid and each connected to act upon a sutiable differential connector and imparting substantially rectilinear movement to an element of such connector corresponding in degree to the degree of difference of expansion of said members.

15. In apparatus responsive to humidity conditions, the combination of wet and dry bulb members and a differential connector acted on by both and receiving therefrom a rectilinear movement proportional or corresponding to the difference of the expansions of said members.

16. In apparatus responsive to changes of humidity, the combination of wet and dry bulb thermo-expansive members, each composed of a plural number of individual cumulatively-acting liquid-containing expansion elements, a differential connector acted upon by both such members and a part connected to such connector and receiving motion therefrom corresponding in extent to the degree of humidity change.

17. The combination of wet and dry bulb thermo-expansive members, a differential connector adapted to receive the expansive or contractile motions of both of such members and having a resultant rectilinear movement of its own which varies in extent according to the change in the differences of such motions, and means for manually shifting the position of said connector independently of the temperature conditions.

18. The combination of wet and dry bulb thermo-expansive members, a rack actuated by each member, a differential gear device receiving motion from each rack, and a part moved by such gear device to positions corresponding to the temperature conditions which jointly affect the said thermo-expansive members.

19. In air-conditioning apparatus, the combination with wet and dry bulb liquid-containing members, each having an active portion movable in response to temperature changes affecting the same, of humidity controlling means differentially operated by said active portions and a temperature controlling device connected to the dry-bulb member and operated by the movement of its aforesaid active portion.

In testimony whereof we affix our signatures, in presence of two witnesses.

STUART W. CRAMER.
WILLIAM B. HODGE.

Witnesses:
ROBERT I. DALTON,
JNO. C. WATSON.